United States Patent [19]

Pattillo

[11] 3,730,444
[45] May 1, 1973

[54] DOUBLE-CUT REVERSIBLE PLATE
[75] Inventor: William Clifford Pattillo, Stone Mountain, Ga.
[73] Assignee: Southern Saw Service, Inc., Atlanta, Ga.
[22] Filed: Apr. 28, 1971
[21] Appl. No.: 138,187

[52] U.S. Cl. ............................................. 241/82.5
[51] Int. Cl. ............................................. B02c 18/36
[58] Field of Search ................ 146/189, 186, 187, 146/188; 241/82.1, 82.5

[56] References Cited

UNITED STATES PATENTS

| 1,987,172 | 1/1935 | Ward | 146/189 R |
| 3,417,800 | 12/1968 | Tipton | 146/186 |

FOREIGN PATENTS OR APPLICATIONS

| 660,927 | 3/1965 | Belgium | 146/186 |

Primary Examiner—Andrew R. Juhasz
Assistant Examiner—Z. R. Bilinsky
Attorney—Newton, Hopkins & Ormsby

[57] ABSTRACT

A plate means having a pair of cutting surfaces with a plurality of apertures extending therethrough defining material extruding passageways. Means is provided for supporting the cutting surfaces adjacent a rotary blade means wherein the rotary blade means and the plate means are operable for chopping material urged against the plate by a screw conveyor. The plate means includes a removable insert member adapted to be axially displaced relative to an opening formed in the plate. The insert member is detailed to be inserted in a selected one of two directions in the plate and includes an axially extending gripping surface. The insert member and the plate means are operatively associated with each other whereby the plate means is reversibly operable to present a selected one of the cutting surfaces adjacent the rotary blade means.

7 Claims, 3 Drawing Figures

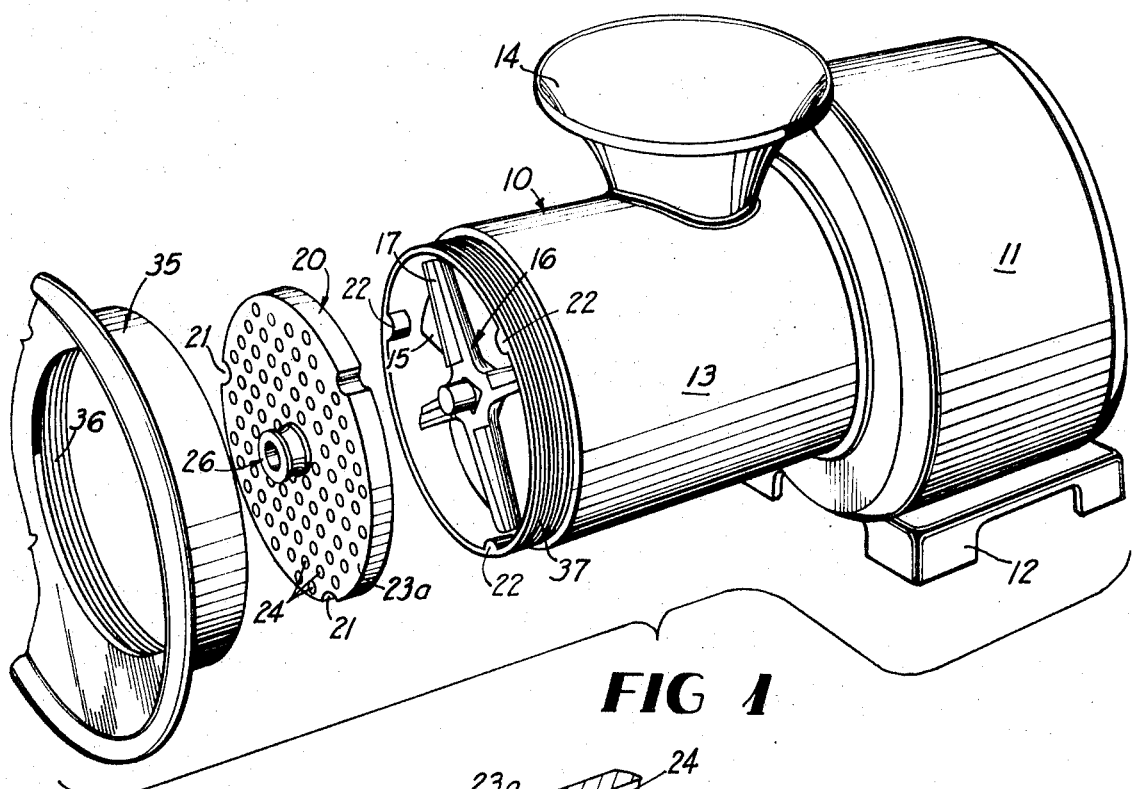
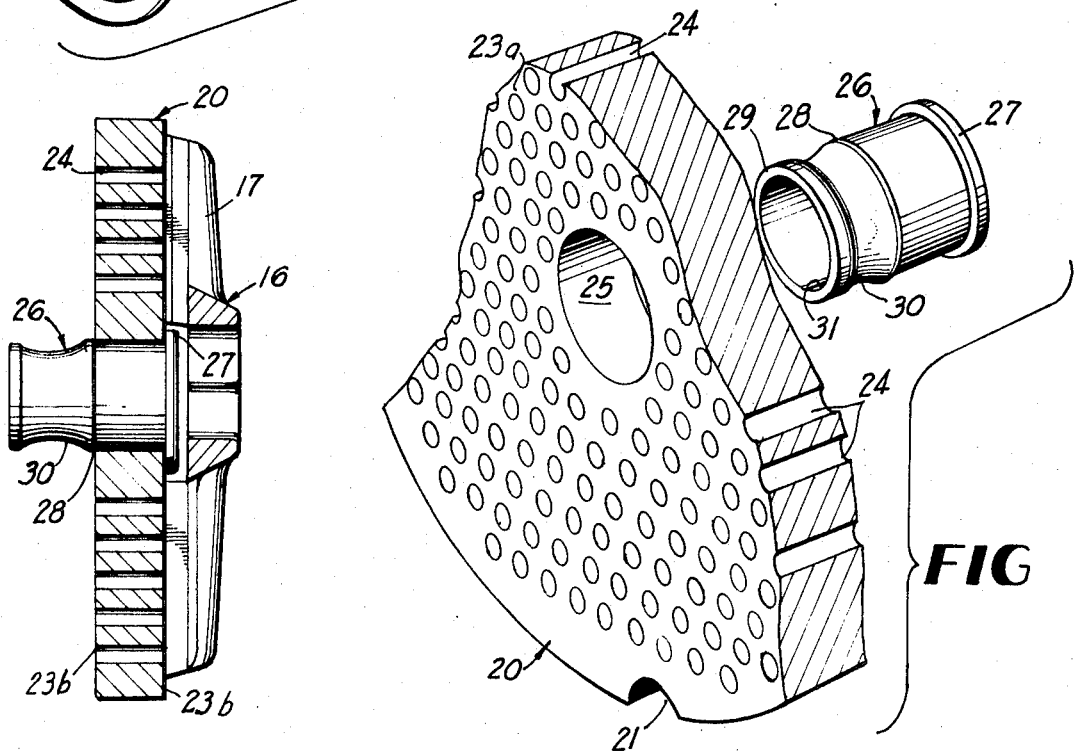
INVENTOR
WILLIAM C. PATTILLO
BY
Newton, Hopkins, & Ormsby
ATTORNEYS

3,730,444

DOUBLE-CUT REVERSIBLE PLATE

BACKGROUND OF THE INVENTION

This invention relates to a meat grinder and is more particularly concerned with a plate means for meat grinders which operates in conjunction with the rotary blade of a meat grinder to comminute or grind meat and the like, fed against the plate. In the past, meat grinders of the general type, having a horizontal shaft which rotates simultaneously, a worm conveyor and a chopper which rides against a perforated plate, have been widely used and are the usual type of meat grinders found in retail meat markets. The chopper or rotary blade of such meat grinders when it becomes dull must be replaced in order to ensure an efficient cutting of the meat. When a new or sharpened rotary blade is placed adjacent a worn plate means, the worn surfaces of the plate define a space between the new or sharpened cutting edge of a replaced rotary blade which space will allow particles of meat to be smeared over the surface of the plate creating a cellophane-like sheet along this surface which affects the cutting efficiency of the meat grinder.

Still another problem with prior art plates utilized in a meat grinder is that the plates do not have any gripping surfaces which will permit an operator to easily remove and replace a plate. Due to the greasy surface of a plate utilized in a meat grinding operation, these plates were difficult to remove and hold during a rotary blade changing operation.

A further problem with the prior art plates used in a meat grinder is that the plates were supported in a nonrotatable position and were provided with an opening extending therethrough for supporting one end of the rotary shaft means of a meat grinder. A rotary displacement of the meat grinder shaft caused movement of the shaft relative to the support opening provided in the chopper plate, which relative movement created an excessive wearing of the support opening. Further, the metal particles removed from the internal shaft supporting surface of the rotary plate due to frictional wear would contaminate the meat being chopped by the meat grinder.

SUMMARY OF THE INVENTION

The disadvantages of the prior art have been overcome by the present invention which basically includes circular-shaped plate means having a pair of opposite faces with a plurality of apertures extending therethrough for defining flow passageways for meat to be extruded therethrough in a grinding operation. The opposite faces of the plate means and the apertures extending therethrough define a pair of opposite cutting surfaces, each of which is adapted to cooperate with a rotary blade of a meat grinder to perform a meat chopping operation when a selected one of the cutting surfaces is supported against a rotary chopper blade and material is urged into contact therewith in a meat chopping operation.

An important feature of the invention includes the removable nylon insert member having a pair of axially spaced radial flange means formed thereon. One of the radial flange means defines a limit stop position for abutting engagement with one surface of the plate and the other radial flange means defines a frictionally engageable, radially displaceable means for abutting engagement with a second surface of the plate means, for securing the insert member in an axially set position within an enlarged opening extending through the plate member. The insert member can be readily removed from and inserted in the enlarged plate opening, allowing the plate means to be reversed to present a selected one of the cutting surfaces into operative cutting engagement with the rotary chopper means.

An additional feature of the present invention is the provision of an axially extending surface formed on the insert member effective for providing a gripping surface to be used in a plate and rotary chopper changing operation.

It is therefore a primary object of the present invention to provide a chopper plate for a meat grinder, the chopper plate having an improved or increased useful plate life.

Another object of the present invention is to provide a meat grinder having a chopper plate which can be reversed to render a selected one of a pair of cutting surfaces operable in a meat chopping operation.

A further object of this invention is to provide a chopper plate for a meat grinder which includes formed gripping surface means operable to be utilized in a chopper plate changing operation.

Yet another object of this invention is to provide an insert means which can be readily removed and replaced relative to a meat grinder chopper plate.

A still further object of this invention is to provide an insert bearing member adapted to be utilized in combination with a chopper plate to reduce the amount of metal particles introduced into meat in a chopping operation.

Another object of this invention is to provide an insert bearing member adapted to be inserted in a meat grinder chopper plate and operative to increase the effective life of the chopper plate.

A further object of this invention is to provide a removable insert bearing member for a meat grinder chopper plate wherein the insert bearing member includes frictionally engageable retaining means.

Still another object of this invention is to provide an insert bearing member for a meat grinder chopper plate wherein the insert member provides a gripping surface effective for improving a chopper plate changing operation.

An additional object of this invention is to provide a reversible chopper plate having an insert bearing member for a meat grinder which is simple in construction, economical to manufacture and reliable in performance.

These and other objects and advantages of the details of construction will become apparent upon reading the following description of the illustrative embodiment embodying the principles of the present invention with reference to the attached drawings wherein like reference numerals have been used to refer to like parts throughout the several figures and wherein:

BRIEF DESCRIPTION OF THE DRAWINGS

FIG. 1 is an exploded perspective view of a conventional meat grinder provided with a chopper plate constructed in accordance with the present invention;

FIG. 2 is a vertical sectional view taken diametrically through the chopper plate shown in FIG. 1 and showing the relationship of the chopper plate with the rotary cutting blade; and FIG. 3 is an enlarged fragmentary exploded perspective view showing details of the chopper plate and insert member.

DESCRIPTION OF THE ILLUSTRATIVE EMBODIMENTS

Referring now to the drawings, the embodiment chosen for the purpose of illustrating the present invention includes a horizontally oriented meat grinder represented generally by the reference numeral 10 and including an operable power motor means 11 mounted on a base 12, the motor carrying a sidewise projecting hollow tubular grinder housing 13. A chute means 14 having a hollow interior and communicating with the interior of housing 13 provides a means by which meat, vegetables or other fibrous material to be comminuted can be fed to the grinder.

Within the grinder housing 13 is a conventional worm conveyor 15 which is rotated about its axis by motor 11. The worm conveyor 15 feeds the meat received through chute 14 forwardly in housing 13. The outer end of worm conveyor 15 is provided with an axially disposed forwardly extending shaft 18 operable for removably receiving a conventional rotary chopper blade 16 supported thereon for rotation with shaft 18 and worm conveyor 15. The rotary chopper blade 16 includes a number of radially extending cutting arms 17 which are adapted to cooperate with a surface of chopper plate 20 embodying the principles of the present invention for chopping meat urged thereagainst by the worm conveyor 15.

As shown in FIGS. 1-3, the chopper plate 20 is substantially circular in configuration and includes a number of radial recessed notches 21 formed in the circumference thereof and adapted to cooperate with complementary projections 22 formed on an internal surface of housing 13 and operable for maintaining the chopper plate in a non-rotatable position when supported against the rotary chopper blade 16. Chopper plate 20 includes a pair of axially spaced surfaces 23, 23a. A plurality of circular apertures 24 are formed in an axially extending direction between the surfaces 23, 23a of plate 20 to define material flow passageways which will allow chopped material to be extruded therethrough in a grinding operation.

The circular apertures 24 are evenly spaced in radially and angularly extending directions to provide an effective cutting surface adjacent each of the plate surfaces 23, 23a. Further, the even distribution of apertures 24 will ensure that meat being urged thereagainst in a grinding operation will be effectively extruded therethrough to provide an efficient chopping operation.

As shown in the drawings, plate 20 includes an enlarged opening 25 which is adapted to receive an insert bearing member 26. Insert member 26 is formed as a substantially cylindrical shaped sleeve means having a first radial flange means 27 formed adjacent one axial edge thereof. A second radial flange means 28 is formed on the cylindrical surface of insert 26 in axially spaced direction from flange 27 and located at a mid portion of insert member 26. A formed gripper surface means 29 is formed integrally with insert 26 and extends axially from flange 28. An outer surface of gripper means 29 is provided with a radially recessed portion 30. The formed radially recessed portion 30 of insert 26 will provide an effective gripping surface whereby the insert 26 and chopper plate 20 can be effectively removed and replaced relative to meat grinder 10. Insert member 26 is provided with a coaxially extending opening 31 detailed in dimensions to receive and support the extended end of shaft 18.

With the insert member 26 in an assembled position, as shown in FIG. 2, radial flange 27 will be in abutting engagement with surface 23 around the peripheral edge of opening 25 and radial flange 28 will be in a biased frictional engagement with surface 23a around the peripheral edge of opening 25. The radial dimensions of flange 27 are detailed to provide an axial limit stop of insert member 26. Radial flange 28 is detailed in dimension and the insert member 26 is constructed of a material which will allow radial biasing movement of flange 28 relative to plate opening 25 whereby the insert member can be frictionally and axially displaced through opening 25. Nylon is one material of which the insert member 26 can be constructed to provide the desired bearing surface characteristics and to provide the radial biasing movement of flange 28.

As shown in FIG. 2, radial flange 27 is detailed in dimensions to be readily received within an axial recessed means formed on rotary cutter means 16 by a radial spacing of cutter arms 17 relative to shaft 18, whereby the cutter blades of arms 17 can be operatively supported in cutting engagement with the surfaces 23, 23a of chopper blade 20.

In an assembled position on meat grinder 10, the plate 20 is secured in an axially set position relative to housing 13 and projections 22 by means of a radial flange 38 provided on collar 35. Collar 35 includes an internal threaded opening 36 detailed in dimensions to be threadably received on an extended external threaded portion 37 of housing 13. Opening 31 of insert 26 is positioned on shaft 18 and chopper plate 20 is urged against rotary chopper blade 16 by collar radial flange 38.

OPERATION

In an assembled position, a grinding operation is performed by inserting material to be chopped through chute 14 into the interior of housing 13. The material inserted into housing 13 is moved axially therethrough by means of the worm conveyor means 15 which will press the material past the radial arm 17 of rotary chopper blade 16 and against a surface of the chopper plate 20. Material that is pressed against chopper plate 20 will be effectively comminuted by rotation of the chopper blade 16 relative to plate 20, with the cutting being performed between the cutting surfaces of arms 17 and the peripheral edges of each of the apertures 24. Material pressed against chopper plate 20 and cut by chopper plate 16 will be extruded axially outward through apertures 24 by worm conveyor means 15.

Should it become necessary to remove the chopper plate 20 from the meat grinder for any reason, such as replacing the chopper plate 20, replacing the chopper blade 16 or merely cleaning out the interior cavity of housing 13, collar member 35 is threadably removed from housing threaded portion 37, thereby permitting the chopper plate 20 to be axially displaced by grasping surface 30 formed on insert member 26. If a new chopper blade 16 is inserted within housing 13, it would be desirable to reverse chopper plate 20 to position a second surface thereof against the cutting arms of the blade 16.

A chopper plate reversing operation is performed by merely pressing the insert member 26 axially, to the right as shown in FIG. 2. Movement of the insert member 26 axially will effect a radial displacement of flanges 28 through opening 25. After the insert member 26 has been removed from opening 25, the chopper plate 20 is conditioned for reversing a chopping surface by reinserting the insert member 26 from the left-to-right, as shown in FIG. 3, with the gripping surface portion 30 being inserted within opening 25 first. Insert member 26 is moved to an axially set position relative to chopper plate 20 by pressing on an axial edge of insert 26 adjacent radial flange 27, an amount sufficient to effect a biasing engagement of radial flange 28 with an opposite surface of chopper plate 20.

It now becomes apparent that the above described illustrative embodiment of a meat chopper plate embodying the principles of the present invention is capable of obtaining the above stated objects and advantages. It is obvious that those skilled in the art may make modifications in the details of construction without departing from the spirit of the invention which is to be limited only by the scope of the appended claims.

What is claimed is:

1. An improved plate means providing a pair of cutting surfaces adapted to be reversibly mounted within a grinder having a rotary blade and support shaft wherein the rotary blade is adapted to be rotated about an axis adjacent a selected one of said pair of cutting surfaces for chopping material urged against said plate, said improved plate comprising:
   a. an integrally formed plate means having a pair of spaced faces with a plurality of apertures extending through said plate for defining passageways for chopped material to be extruded therethrough and wherein each of said faces and said apertures define cutting surfaces adapted to cooperate with said rotary blade for chopping material when supported against said rotary blade, means defining an enlarged opening adjacent a center of said plate and extending therethrough, and
   b. a removable insert member coaxially supported within said enlarged opening, said insert member including an opening extending therethrough for receiving a grinder shaft means, said insert member including means defining a first radially extending flange means supported in abutting engagement with a first face of said plate and means defining a second axially spaced radial flange means supported in abutting engagement with a second face of said plate means and wherein at least one of said flange means is detailed in dimension and said plate is constructed of a material which will permit a fictional sliding axial displacement of said one flange means relative to said enlarged opening whereby said insert member can be removed from or inserted within said enlarged opening of said plate means, at least one of said radial flange means being formed on said insert member adjacent an axial edge thereof, with said insert member including a gripping surface extending axially outwardly from said other flange means.

2. An improved plate means providing a pair of cutting surfaces adapted to be reversibly mounted within a grinder having a rotary blade and support shaft wherein the rotary blade is adapted to be rotated about an axis adjacent a selected one of said pair of cutting surfaces for chopping material urged against said plate, said improved plate comprising an integrally formed plate means having a pair of spaced surfaces with a plurality of apertures extending through said plate for defining passageways for chopped material to be extruded therethrough and wherein each of said faces and said apertures define cutting surfaces adapted to cooperate with said rotary blade for chopping material when supported against said rotary blade, means defining an enlarged opening adjacent a center of said plate and extending therethrough, and a movable insert member coaxially supported within said enlarged opening, said insert member including an opening extending therethrough for receiving a grinder shaft, said insert member including a first radially extending flange means supported in abutting engagement with a first face of said plate means and means defining a second axially spaced radial flange means supported in abutting engagement with a second face of said plate means, said insert member being formed of a compressible material and one of said flange means being so preportioned that it can be compressed and passed through said enlarged opening in said plate means and, when positioned beyond said enlarged opening, will expand and engage the adjacent face of said plate member, whereby said plate member will be held between said flange means, and said insert member can be removed when desired by compressing said last-mentioned flange means and withdrawing it through said enlarged opening.

3. An improved plate means as described in claim 1, further characterized in that said gripping surface includes means defining a radial recessed gripping portion whereby said plate means can be effectively supported by said recessed gripping surface axially extending outwardly from said other flange means.

4. An improved plate means as described in claim 3, further characterized in that said flange means formed axially adjacent said gripping surface includes said detailed dimensions permitting said displacement thereof through said enlarged opening of said plate means.

5. An improved plate means as described in claim 4, further characterized in that said radial flange means adjacent an axial edge of said insert member is detailed in radial dimension to provide an effective limit stop means for abutting engagement with one surface of said plate means to block axial displacement of said insert member relative to said plate means in an axial direction toward said limit stop means.

6. An improved plate means as described in claim 1, further characterized in that said insert member is constructed of a synthetic material having predetermined flexible characteristics which will permit said axial displacement of said insert member relative to said plate means.

7. An improved plate means as described in claim 6, further characterized in that said insert member is constructed of nylon material.

\* \* \* \* \*